(12) United States Patent
Shi

(10) Patent No.: US 7,565,579 B2
(45) Date of Patent: Jul. 21, 2009

(54) POST (POWER ON SELF TEST) DEBUG SYSTEM AND METHOD

(75) Inventor: Wh Shi, Taipei (TW)

(73) Assignee: Inventec Corporation, Taipei (TW)

( * ) Notice: Subject to any disclaimer, the term of this patent is extended or adjusted under 35 U.S.C. 154(b) by 477 days.

(21) Appl. No.: 11/393,526

(22) Filed: Mar. 29, 2006

(65) Prior Publication Data

US 2007/0174705 A1 Jul. 26, 2007

(30) Foreign Application Priority Data

Dec. 14, 2005 (TW) .............................. 94144209 A

(51) Int. Cl.
*G06F 11/00* (2006.01)
*G06F 11/36* (2006.01)
(52) U.S. Cl. ....................... 714/38; 714/15; 714/21; 713/2
(58) Field of Classification Search .................. 714/51, 714/55, 15, 19, 21, 36–38, 49; 713/2
See application file for complete search history.

(56) References Cited

U.S. PATENT DOCUMENTS

| | | | | |
|---|---|---|---|---|
| 5,379,342 A * | 1/1995 | Arnold et al. | ................... | 380/2 |
| 5,805,882 A * | 9/1998 | Cooper et al. | ................... | 713/2 |
| 5,826,075 A * | 10/1998 | Bealkowski et al. | ........ | 713/187 |
| 5,850,562 A * | 12/1998 | Crump et al. | ................... | 713/1 |
| 5,974,546 A * | 10/1999 | Anderson | ....................... | 713/2 |
| 6,112,320 A * | 8/2000 | Dien | ............................ | 714/51 |
| 6,393,586 B1 * | 5/2002 | Sloan et al. | .................... | 714/25 |
| 6,807,643 B2 * | 10/2004 | Eckardt et al. | ................. | 714/36 |
| 6,892,332 B1 * | 5/2005 | Gulick | ......................... | 714/55 |
| 6,910,157 B1 * | 6/2005 | Park et al. | ...................... | 714/36 |
| 6,968,477 B2 * | 11/2005 | Mehta et al. | ................... | 714/31 |
| 6,976,188 B2 * | 12/2005 | Podgorsky et al. | ............ | 714/36 |
| 7,318,151 B1 * | 1/2008 | Harris | ............................ | 713/2 |
| 2005/0039081 A1* | 2/2005 | Chang et al. | ................... | 714/36 |
| 2006/0117171 A1* | 6/2006 | Chen | .............................. | 713/2 |

OTHER PUBLICATIONS

Wikipedia's Baseboard Management Controller http://en.wikipedia.org/w/index.php?title=Baseboard_management_controller&oldid=25235703 version from Oct. 10, 2005.*

* cited by examiner

*Primary Examiner*—Scott T Baderman
*Assistant Examiner*—Joseph Schell
(74) *Attorney, Agent, or Firm*—Jianq Chyun IP Office

(57) ABSTRACT

A POST (power on self test) debug system and method applicable to an electronic device is proposed. First, a reading module reads a POST code of a sub-routine to be executed when the electronic device is started up to execute a power on self test, and sends the POST code to a processing module. When the processing module receives the POST code, the processing module temporarily stores the POST code and detects whether the temporarily stored POST code has been changed at a predefined time interval. If no, the processing module records the temporarily stored POST code such that a user can fine reason for error according to the recorded POST code and repair the system timely. Such a debug system is simple and easy to implement.

11 Claims, 2 Drawing Sheets

POST (POWER ON SELF TEST) DEBUG SYSTEM AND METHOD

BACKGROUND OF THE INVENTION

1. Field of the Invention

The present invention relates to a debug system and method, and more particularly to a POST (power on self test) debug system and method which can be applied to electronic devices such as server systems.

2. Description of Related Art

On startup of a server system, a central processing unit (CPU) reads routines stored on a BIOS (basic input output system) chip of the motherboard for initializing hardwares within the server system. Through the routines, registers of the CPU are tested first and then peripheral devices such as a dynamic random access memory (DRAM), a motherboard chipset, a display card and so on are initialized. The initialization of the hardwares includes adding values to registers or changing register values according to some specific technology files such that chipset memory, I/O functions and so on can operate normally.

However, some errors such as hardware errors or BIOS routine errors may occur during the initializing process. Such errors can lead to fail operation of the server system. Since the BIOS routine code is small in size and the operation system (OS) has not been loaded to the server system during the initializing process, it is impossible to use large size debug software for debugging. Instead, a user only can search errors from original codes or use some specific devices for debugging hardware at a rather low speed.

To overcome the above defect and increase the debug speed, a plurality of I/O ports is defined as debug ports such as Ports 80H, 84H and 85H. During a power on self test, while a certain POST routine is executed, a POST code value corresponding to the routine will be sent to a port such as port 80H I/O. Through a specific debug peripheral device such as a POST card, the post code value can be acquired and displayed. The POST code will be kept without being changed until the next POST routine is executed. Thus, before an operation system is loaded, a user can find reason for error through the post code value displayed by a debug peripheral device such as a POST card.

However, the above debug system needs a POST card having a decode circuit for decoding the POST code and a display means such as a LED for displaying the debug status, thereby increasing the debug cost. Further, both a PCI slot for receiving the POST card and the LED need to be disposed on the motherboard, which thus limit the motherboard layout flexibility. Furthermore, when the server system begins to reset because of some errors of the routines, the POST code value is easy to lose, which accordingly increases the debug difficulty for developers.

Although combining an ISA bus or a LPT bus with a POST card is also possible for system debugging, such a method is rather complex and difficult to implement.

Accordingly, there is a need to develop a POST debug technology which can overcome the defects of the conventional technology.

SUMMARY OF THE INVENTION

According to the above defects, an objective of the present invention is to provide a POST debug system and method which is simple and easy to operate, thereby reducing the cost.

Another objective of the present invention is to provide a POST debug system and method which can efficiently record POST routine information, thereby improving the debug efficiency.

A further objective of the present invention is to provide a POST debug system and method which can provide great flexibility for motherboard layout of a server system.

To achieve the above and other objectives, the present invention proposes a POST debug system and method applicable to an electronic device. The POST debug system of the present invention comprises a reading module for reading a POST code of a sub-routine to be executed when the electronic device is started up to execute a power on self test, and outputting the POST code; and a processing module for receiving and temporarily storing the POST code from the reading module, detecting whether the temporarily stored POST code has been changed at a predefined time interval, and recording the temporarily stored POST code when the temporarily stored POST code has not been changed at the predefined time interval. The recorded POST code can then be used by a user for debugging the system.

According to another embodiment, the processing module further determines whether the temporarily stored POST code is an exit code of the sub-routine, if yes, the processing module sends information that indicates the power on self test of the server system is normal.

The processing module comprises a temporarily storing unit for temporarily storing the POST code outputted by the reading module; a detecting unit for detecting whether the POST code has been changed at the predefined time interval, if not, the detecting module outputs a triggering signal; and a recording unit for recording the POST code temporarily stored by the temporarily storing unit when the recording unit receives the triggering signal.

The processing module can further comprise a determining module for determining whether the POST code temporarily stored by the temporarily storing unit is an exit code of the sub-routine, if yes, the recording unit records information that indicates the power on self test of the electronic device is normal.

In an embodiment, the processing module is a baseboard management controller (BMC).

The POST debug system further comprises a resetting module for generating a resetting signal after receiving the triggering signal outputted by the detecting unit so as to make the electronic device perform a resetting operation.

The POST debug method proposed by the present invention can be applied to an electronic device having a POST debug system. The POST debug method of the present invention comprises the steps of: starting up the electronic device to execute a power on self test; reading a POST code of a sub-routine to be executed; temporarily storing the POST code; and detecting whether the temporarily stored POST code has been changed at a predefined time interval and recording the POST code when the temporarily stored POST code has not been changed at the predefined time interval.

In an embodiment, the POST debug method of the present invention further comprises generating a resetting signal when the POST code has not been changed at the predefined time interval so as to make the electronic device perform a resetting operation.

The POST debug system and method of the present invention do not need such peripheral debug devices as a POST card for getting POST code of a sub-routine that is written in an I/O port such as Port 80H. As a result, the POST debug system and method of the present invention is simple and easy to operate. Also, the debug cost can be low.

Further, since the present invention records the POST code before the power on self test of the server system fails and resets, a system developer or an administrator can quickly and efficiently find reason for error and repair the system, thereby saving a large amount of time and labor and enhancing the work efficiency. Furthermore, the present invention provides greater flexibility for the motherboard layout of the server system.

DETAILED DESCRIPTION OF PREFERRED EMBODIMENTS

Hereunder, embodiments of the present invention will be described in full detail with reference to the accompanying drawings.

Figure 1:
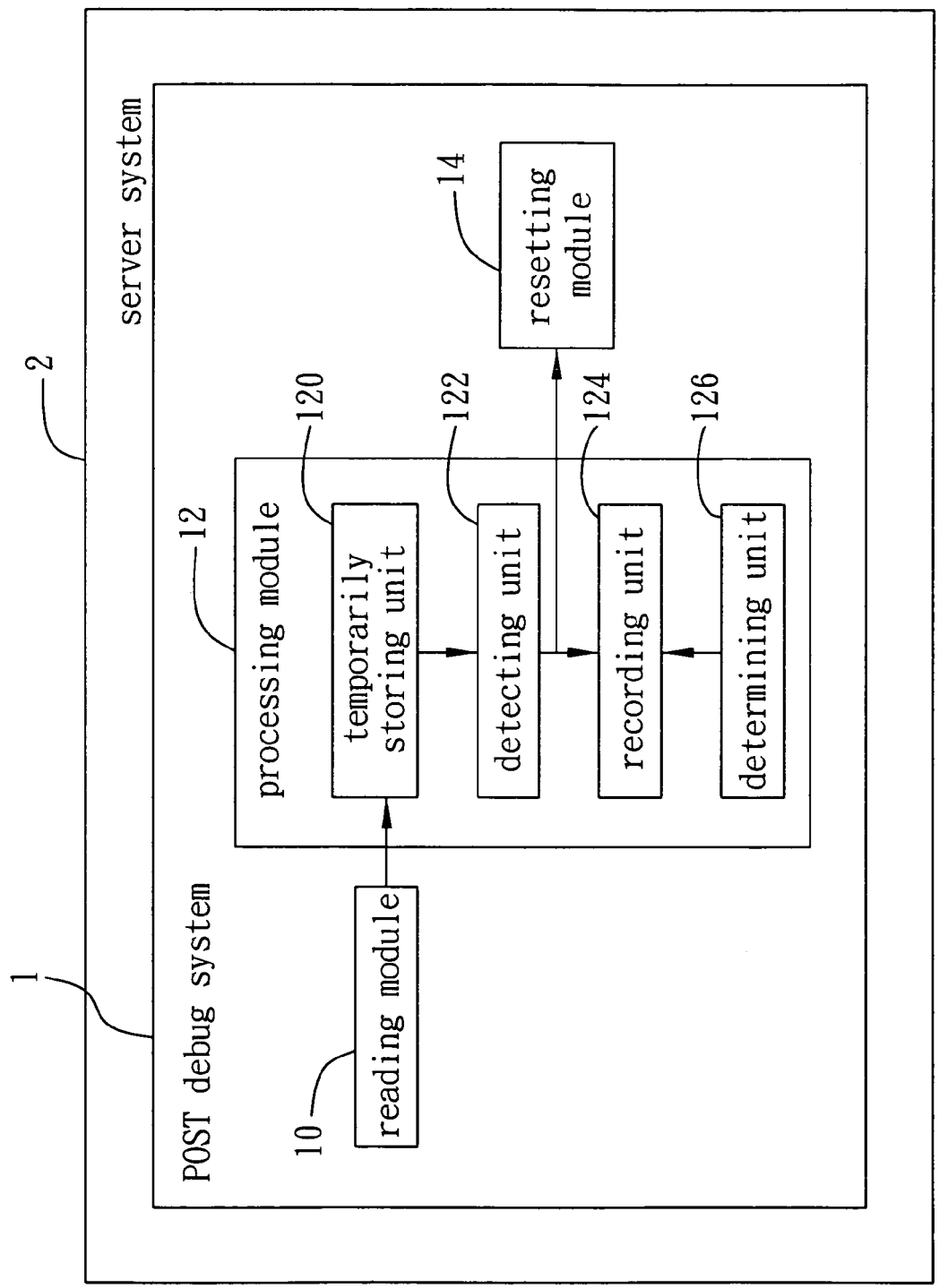
FIG. 1 is a block diagram of a POST debug system according to the present invention.

FIG. 1 is a block diagram of a POST (power on self test) debug system 1 of the present invention. The POST debug system 1 can be applied to an electronic device such as a server system 2, although it is not limited thereto. As shown in FIG. 1, the POST debug system 1 comprises a reading module 10 and a processing module 12.

The reading module 10 is used to read a POST code of a sub-routine to be executed when the server system 2 is started up to execute a power on self test. The reading module 10 then outputs the POST code to the processing module 12 for further processing. In the present invention, the reading module 10 is a basic input/output system (BIOS) of the server system 2, which comprises a plurality of sub-routines for executing the power on self test. Therein, each of the sub-routines has one and only POST code for testing a different hardware configuration around the central processing unit (CPU), and each of the sub-routines has an exit code indicating the end of the sub-routine. When the server system 2 is started up to execute a power on self test, the base input/output system will read a POST code of a sub-routine to be executed and the POST code is then provided to the processing module 12. In the present invention, the basic input/output system also writes the POST code to a predefined I/O port such as port 80H. Since it is a conventional technology, detailed description of it is omitted.

The processing module 12 is used to receive and temporarily store the POST code read by the reading module 10. The processing module 12 also detects whether the POST code has been changed at a predefined time interval. If the POST code has not been changed at the predefined time interval, it means that the power on self test still stays in the sub-routine corresponding to the POST code. In this circumstance, the processing module 12 will record the POST code such that a user can timely find reason for error according to the POST code such as motherboard hardware error or BIOS error, and repairs the system timely. Furthermore, the processing module 12 determines whether the POST code is an exit code of the sub-routine, if yes, the processing module 12 will record information that indicates the power on self test is normal. According to the information, a system developer can timely know the quality of the basic input/output system and a server administrator can timely know the operating status of the server system 2.

The abovementioned processing module 12 further comprises a temporarily storing unit 120, a detecting unit 122, a recording unit 124 and a determining unit 126.

The temporarily storing unit 120 is used to temporarily store the POST code received by the processing module 12. In the present invention, the temporarily storing unit 120 is a buffer.

The detecting unit 122 is used to detect whether the POST code of the temporarily storing unit 120 has been changed at a predefined time interval, that is, the detecting unit 122 detects whether the POST code of the temporarily storing unit 120 has been replaced by a POST code of another sub-routine. If the POST code has not been changed at the predefined time interval, it means the power on self test of the server system 2 remains in the sub-routine corresponding to the POST code, which means the power on self test of the server system 2 fails. In this circumstance, the detecting unit 122 will output a triggering signal.

In the present invention, the detecting unit 122 can be a timer, which starts to record time when the processing unit 12 receives a POST code of a sub-routine. When the processing unit 12 receives another POST code corresponding to a different sub-routine, the detecting unit 122 is reset to zero and starts to record time again. If the time value recorded by the timer exceeds a predefined value such as five minutes, it means the power on self test of the server system 2 remains in the sub-routine corresponding to the POST code, which means the power on self test of the server system fails. In this circumstance, the timer outputs a triggering signal to the recording unit 124.

Once the recording unit 124 receives the triggering signal, the recording unit 124 will record the POST code temporarily stored by the temporarily storing unit 120 such that a developer or an administrator can timely find reason for error according to the recorded POST code and ensure the normal operation of the server system 2.

The determining unit 126 is used to determine whether the POST code received by the processing module 12 is an exit code of a sub-routine. If yes, the recording unit 124 records information that indicates the power on self test of the server system 2 is normal. In the present invention, the determining unit 126 determines whether the POST code is an exit code by comparing the POST code with a code predefined by a user.

In the present invention, the processing module 12 can be a baseboard management controller (BMC) of the server system 2. The baseboard management controller can send the information generated by the POST debug system of the present invention to a remote control device through a communication network such that a server administrator can timely know the operation status of the server system and take some protection methods timely when necessary, such as reset or shut down the server system 2 through remote routines. Also, a user can set a POST code as a skipping code, that is, the sub-routine corresponding to the POST code will be skipped during the power on self test of the server system 2. Accordingly, the determining unit 126 of the baseboard management controller determines whether the POST code temporarily stored in the temporarily storing unit 120 is the skipping code set by the user, if yes, the baseboard management controller controls the power on self test of the server system such that the sub-routine corresponding to the POST code can be skipped.

The POST debug system 1 of the present invention further comprises a resetting module 14, which is used to generate a resetting signal after receiving the triggering signal sent by the detecting unit so as to reset the server system 2.

Figure 2:
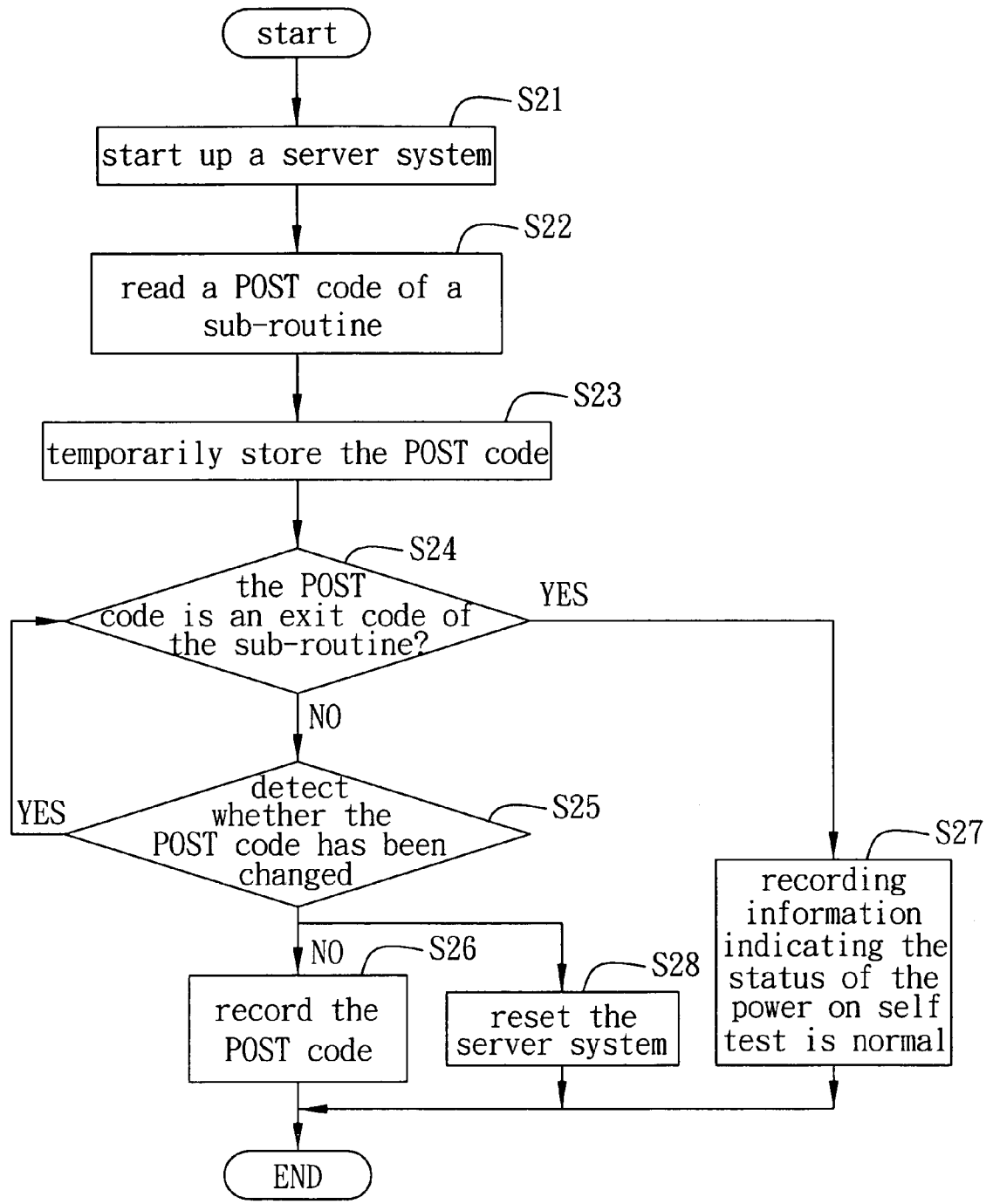
FIG. 2 is a process flow diagram of a POST debug method of the present invention.

FIG. 2 shows a POST debug method used by the POST debug system of the present invention.

First, at step S21, the server system 2 is started up to execute a power on self test. Then, process flow moves to step S22.

At step S22, the reading module 10 reads a POST code of a sub-routine to be executed during the power on self test and outputs the POST code to the processing module 12. Then, process flow moves to step S23.

At step S23, the processing module 12 receives the POST code and temporarily stores the POST code in a temporarily storing unit 120. Thereafter, process flow moves to step S24.

At step S24, the determining unit 126 determines whether the POST code temporarily stored by the temporarily storing unit 120 is an exit code, that is, the determining unit 126 determines whether the POST code is equal to a code predefined by a user. If yes, process flow moves to step S27, otherwise, process flow moves to step S25.

At step S25, the detecting unit 122 detects whether the POST code temporarily stored in the temporarily storing unit 120 has been changed at a predefined time interval, that is, the detecting unit 122 detects whether the POST code temporarily stored in the temporarily storing unit 120 has been replaced by another POST code received by the processing module 12, if yes, process flow moves to step S24, otherwise, the detecting unit 122 sends a triggering signal to the recording unit 124 and process flow moves to step S26.

At step S26, the recording unit 124 records the POST code temporarily stored by the temporarily storing unit 120.

At step S27, the recording unit 124 records information that indicates the power on self test of the server system 2 is normal and the process flow is ended.

Referring to FIG. 2 again, another step S28 can be performed after step S25 according to another embodiment. At step S28, the resetting module 14 generates a resetting signal according to the triggering signal of the detecting unit 122 so as to reset the server system 2. Further, it should be noted that step S26 and step S28 can be performed in sequence or at the same time.

The POST debug method of the present invention further comprises the following step: the determining unit 126 determines whether the POST code temporarily stored by the temporarily storing unit 120 is a skip code, if yes, the processing module 12 controls the power on self test of the server system such that the sub-routine corresponding to the POST code can be skipped. This step can be performed parallel to step S24 or performed before or after step S24 according to the need.

Therefore, the POST debug system and method of the present invention can debug the power on self test of the server system by only using the current configuration of the server system, which eliminates the need of additional hardware configurations such as hardware for reading the POST 80H code, decoding hardware and display processing hardware. Thus, the POST debug system and method of the present invention is simple and easy to implement. Also, the cost of such a debug system is lower. Further, before the power on self test of the server system fails and resets, the POST code temporarily stored in the buffer can be recorded such that after the server system resets, a system developer or an administrator can quickly and efficiently fined reason for error and repair the system, thereby saving a large amount of time and labor and enhancing the work efficiency. Furthermore, the present invention provides greater flexibility for the motherboard layout of the server system.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A POST (power on self test) debug system applicable to an electronic device, comprising:
    a reading module for reading a POST code of a sub-routine to be executed when the electronic device is started up to execute a power on self test, and outputting the POST code; and
    a processing module for receiving the POST code from the reading module, the processing module comprising:
        a temporarily storing unit for temporarily storing the POST code outputted by the reading module;
        a detecting unit for detecting whether the POST code has been changed in a predefined time interval, wherein if the POST code has been changed in the predefined time interval, the detecting module outputs a triggering signal; and
        a recording unit for recording the POST code temporarily stored by the temporarily storing unit when the recording unit receives the triggering signal.

2. The POST debug system of claim 1, wherein the processing module is further for determining whether the temporarily stored POST code is an exit code of the sub-routine, wherein if the temporarily stored POST code is the exit code of the sub-routine, the processing module records information that indicates the power on self test of the electronic device is normal.

3. The POST debug system of claim 1, wherein the processing module further comprises a determining unit for determining whether the POST code temporarily stored by the temporarily storing unit is an exit code of the sub-routine, wherein if the POST code temporarily stored by the temporarily storing unit is the exit code of the sub-routine, the recording unit records information that indicates the power on self test of the electronic device is normal.

4. The POST debug system of claim 1, further comprising a resetting module for generating a resetting signal after receiving the triggering signal outputted by the detecting unit so as to make the electronic device perform a resetting operation.

5. The POST debug system of claim 1, wherein the processing module is a baseboard management controller (BMC).

6. The POST debug system of claim 1, wherein the electronic device is a server system.

7. A POST debug method applicable to an electronic device with a POST debug system, the method comprising the steps of:
    starting up the electronic device to execute a power on self test;
    reading a POST code of a sub-routine to be executed and outputting the POST code;
    temporarily storing the output POST code; and
    detecting whether the temporarily stored POST code has been changed at a predefined time interval and recording the POST code when the temporarily stored POST code has not been changed at the predefined time interval.

8. The POST debug method of claim 7, further comprising generating a resetting signal when the POST code has not been changed at the predefined time interval so as to make the electronic device perform a resetting operation.

9. The POST debug method of claim 7, further comprising determining whether the temporarily stored POST code is an exit code of the sub-routine and recording information that indicates the power on self test of the electronic device is normal if the temporarily stored POST code is an exit code.

10. The POST debug method of claim 9, further comprising determining whether the temporarily stored POST code has been changed at a predefined time interval when the temporarily stored POST code is not an exit code, and further recording the temporarily stored POST code when the temporarily stored POST code has not been changed at the predefined time interval.

11. The POST debug method of claim 7, wherein the electronic device is a server system.

* * * * *